(12) United States Patent
Simske et al.

(10) Patent No.: US 9,648,176 B2
(45) Date of Patent: May 9, 2017

(54) MULTIFUNCTIONAL DOCUMENT PROCESSING DEVICE RETRIEVING INFORMATION ON BEHALF OF MOBILE DEVICE

(71) Applicant: Hewlett-Packard Development Company, L.P., Fort Collins, CO (US)

(72) Inventors: Steven J Simske, Ft. Collins, CO (US); Peter G Hwang, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/787,740

(22) PCT Filed: Jun. 28, 2013

(86) PCT No.: PCT/US2013/048612
§ 371 (c)(1),
(2) Date: Oct. 28, 2015

(87) PCT Pub. No.: WO2014/209372
PCT Pub. Date: Dec. 31, 2014

(65) Prior Publication Data
US 2016/0088169 A1    Mar. 24, 2016

(51) Int. Cl.
*H04N 1/00*   (2006.01)
*G06F 3/12*   (2006.01)
*H04W 4/00*   (2009.01)
*H04W 76/02*  (2009.01)

(52) U.S. Cl.
CPC ....... *H04N 1/00307* (2013.01); *G06F 3/1204* (2013.01); *G06F 3/1205* (2013.01);
(Continued)

(58) Field of Classification Search
CPC ........... H04N 1/00307; H04N 1/00244; H04N 2201/0094; G06F 3/1205; G06F 3/1204;
(Continued)

(56) References Cited

U.S. PATENT DOCUMENTS 8,189,225 B1    5/2012   Lo et al.
8,412,592 B2    4/2013   Burnett
(Continued)

OTHER PUBLICATIONS

"Xerox WorkCentr 7800 Series Multifunction Printer Transform the way you work", Mar. 20, 2013.
(Continued)

*Primary Examiner* — Andrew H Lam
(74) *Attorney, Agent, or Firm* — HP Inc. Patent Department

(57) ABSTRACT

A method for operating a mobile device. The method includes receiving a software application for the multifunctional document processing device by the mobile device, establishing a local connection with the mobile device to a multifunctional document processing device, and generating with the software application a service request by the mobile device, wherein the service request includes service request data. The method further includes transmitting the service request with the software application to the multifunctional document processing device and receiving, by the software application of the mobile device, return data in response to the service request from the multifunctional document processing device. The mobile device does not provide a location of the mobile device to a service provider of the mobile device.

15 Claims, 6 Drawing Sheets

(52) U.S. Cl.
CPC .......... *G06F 3/1238* (2013.01); *G06F 3/1292* (2013.01); *H04N 1/00244* (2013.01); *H04W 4/008* (2013.01); *H04W 76/023* (2013.01); *H04N 2201/0094* (2013.01)

(58) Field of Classification Search
CPC .... G06F 3/1238; G06F 3/1292; H04W 4/008; H04W 76/023
USPC ........................................................ 358/1.15
See application file for complete search history.

(56) References Cited

U.S. PATENT DOCUMENTS

| | | | |
|---|---|---|---|
| 2004/0203358 A1* | 10/2004 | Anderson | G06F 3/1204 455/41.1 |
| 2004/0252333 A1 | 12/2004 | Blume et al. | |
| 2006/0080384 A1 | 4/2006 | Robinson et al. | |
| 2008/0037062 A1 | 2/2008 | Omino et al. | |
| 2011/0080613 A1 | 4/2011 | Mathur | |
| 2011/0255110 A1 | 10/2011 | D'Entrecasteaux | |
| 2012/0105905 A1 | 5/2012 | Wei et al. | |
| 2013/0072770 A1* | 3/2013 | Rao | A61B 5/0031 600/323 |
| 2014/0055491 A1* | 2/2014 | Malamud | G06T 19/006 345/633 |

OTHER PUBLICATIONS

The International Search Report and the Written Opinion, mailed Feb. 28, 2014, issued in related PCT Application No. PCT/US2013/048612.

* cited by examiner

MULTIFUNCTIONAL DOCUMENT PROCESSING DEVICE RETRIEVING INFORMATION ON BEHALF OF MOBILE DEVICE

BACKGROUND

Mobile communication technologies have seen dramatic improvements over the past few years. Increasing number of today's users carry multiple mobile devices, each of the devices being equipped with a diverse set of communication or radio interfaces. Through these interfaces, the mobile devices can establish communications with each other, reach the Internet, or access various devices and services through different networks. Various devices such as Internet-enabled tablets, smart phones, laptops, televisions, and gaming consoles have become essential personal accessories, connecting users to friends, work, and entertainment. With the increased use of mobile devices, the need for efficient and cost effective use of these devices also increases.

DETAILED DESCRIPTION

Figure 1:
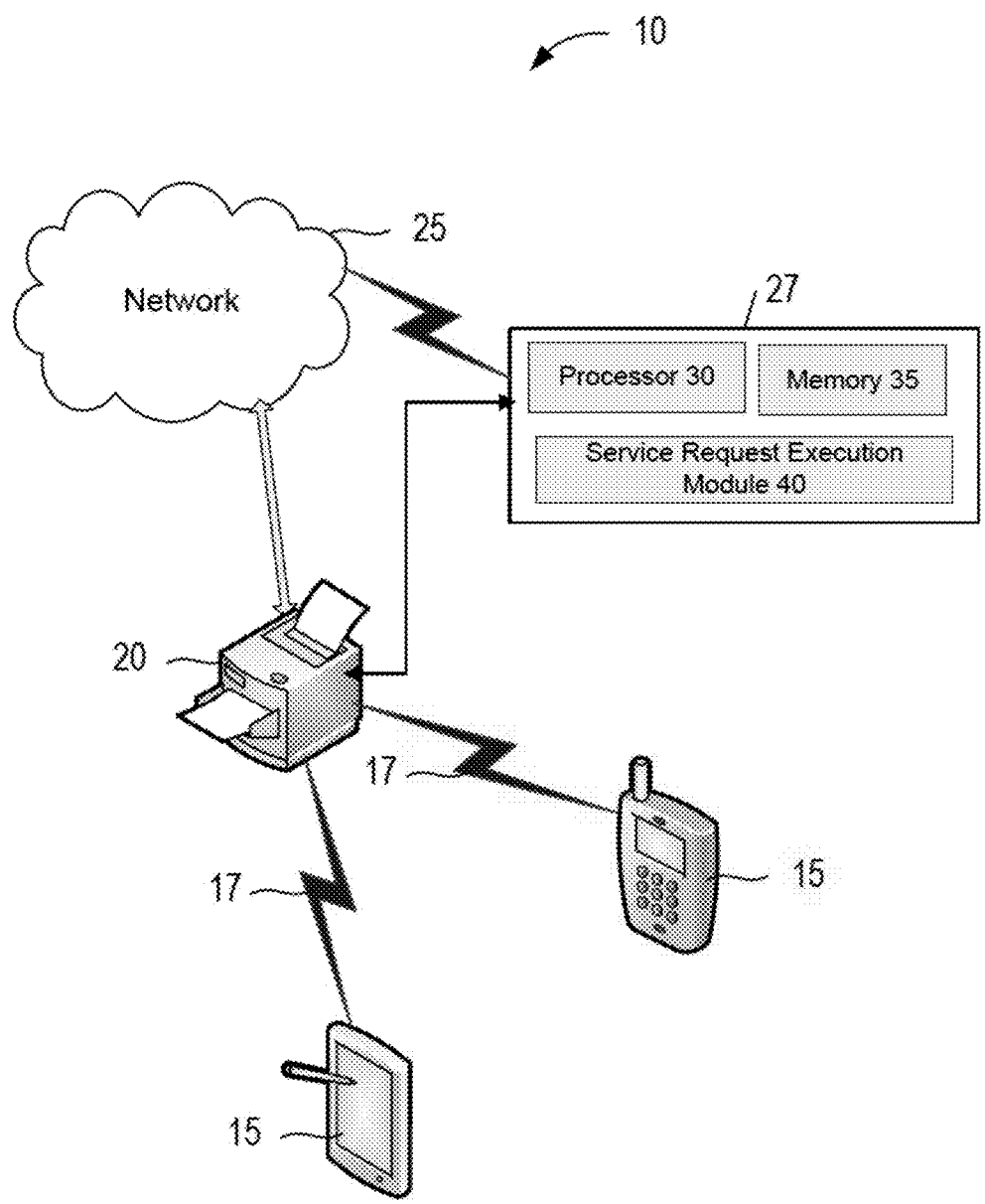
FIG. 1 is a schematic illustration of an example of a system for operating a mobile device and a multifunctional document processing device to anonymize the operation of the mobile device.

With the improvements in mobile technology, mobile users can now shift various operations, communications, and tasks from different systems to their mobile devices. For example, mobile users may shift the tasks performed on the user interface of a multifunctional document processing device (e.g., printer, copier, etc.) to their mobile device. That way, mobile users can save time and operate the multifunctional document processing device more efficiently. In addition, various applications on the mobile device can be used in combination with the multifunctional device without the need to transfer specific software on the multifunctional device As the value and use of information continue to increase, mobile providers look for improved ways to capture, analyze, and process information retrieved from the users of the mobile devices supported by these providers. When a mobile user is connected to the network of the mobile provider, the provider may automatically receive data about the location of the mobile users. Further, the mobile provider may receive various data about the use of the mobile device by the mobile user. For example, the mobile provider can receive data about the services utilized by the mobile users (e.g., visited websites, performed searches, purchases, etc.), the data received based on these services (e.g., list of restaurants), the user's personal data related to shopping, movies, etc. The service provider may use that data to promote various products or services to the mobile users, or it can simply sell it to third parties for marketing purposes. In addition, the mobile users generally pay a subscription fee to the service provider and receive a different data package that can use for a predetermined amount of time.

Users, on the other hand, look for different ways to avoid providing their personal usage information to the mobile providers. User also look for ways to search the web with at a greater speed (i.e., with a greater bandwidth) and to avoid expensive data charges when they exceed the data limit contracted with the mobile provider. One way for users to avoid excessive data charges by the mobile provider is to use local networks to connect to the Internet instead of using the providers network.

This description is directed to systems, methods, and machine-readable storage media for operating a mobile device and a multifunctional document processing device to anonymize the mobile device location and the data generated and received by the mobile device. The description proposes using a multifunctional document processing device (e.g., a printer) as an "aggregator" to perform different request for services (e.g., located based services such a restaurant search) generated from a mobile device on the multifunctional document processing device without disclosing the location of the mobile device and any data associated with the services to the mobile provider.

In particular, the description proposes receiving a software application for the multifunctional document processing device by the mobile device, establishing a local connection with the mobile device to a multifunctional document processing device, and generating with the software application a service request by the mobile device. The service request includes service request data. The description further proposes transmitting the service request with the software application to the multifunctional document processing device, receiving, by the software application of the mobile device, return data in response to the service request from the multifunctional document processing device. The service request is executed with the software application on the multifunctional document processing device, and the mobile device does not provide a location of the mobile device to the service provider of the mobile device.

Multifunctional document processing devices (e.g., printers, scanners, etc.) and local networks (e.g., Wi-Fi, Bluetooth, etc.) are typically available to many mobile users (i.e., at their current offices, visiting offices, conference rooms, hotels, etc.). Many of these multifunctional document processing devices may perform different functions and have various processing capabilities. Thus, by using the proposed systems and methods, the mobile users can utilize these multifunctional resources to avoid submitting their personal information to the mobile providers and to avoid incurring data charges. The multifunctional document processing devices can provide a platform for independent access to a wide variety of services for the mobile device (e.g., location-based and other services accessed by operating system of the mobile device). Since the services are not communicated through the mobile provider, they are not read by the mobile provider and thus not associated with the mobile device user.

In addition, by using multifunctional document processing devices to perform the services requested by the mobile devices, mobile users may use the greater bandwidth provided by the multifunctional document processing devices. Further, since the mobile users are not using their mobile devices for the different services, they can preserve the battery life of the mobile devices. Also, since the service requests by the mobile users are actually performed on the multifunctional document processing devices, the mobile users are not using their mobile data plans and may avoid expensive data charges from the mobile providers.

As used herein, the terms "mobile device" and "wireless device" may be used interchangeably and refer to any one of various smart-phones (e.g., Samsung Galaxy®), cellular telephones, tablets, (e.g., iPAD®), laptop computers, personal data assistants (PDA's), VoIP phones, wireless enabled televisions, wireless enabled entertainment systems, and other similar portable electronic devices (Google Glass®, etc.) that include a processor and are capable of sending and receiving wireless or wired communication signals.

In addition, as used herein the term "multifunctional document processing device" or "multifunctional device" may be used interchangeably and refer to a device that incorporates the functionality of multiple devices in one and provide centralized document management, distribution, and production to its users. Some examples of multifunctional document processing devices include a multifunctional printer, a scanner, a copier, or a facsimile.

Further, as used herein, the term "communication interface" refers to various protocols available to any of the wireless devices to communicate with each other and with a network. In particular, the communications interface may include Wi-Fi, Bluetooth, 3G, 4G, and any other comparable communications interfaces.

In the following detailed description, reference is made to the accompanying drawings, which form a part hereof, and in which is shown by way of illustration specific examples in which the disclosed subject matter may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. It should also be noted that a plurality of hardware and software based devices, as well as a plurality of different structural components may be used to implement the disclosed methods and systems.

FIG. 1 is a schematic illustration of an example of a system 10 for operating a mobile device and a multifunctional document processing device to anonymize the operation of the mobile device. The system 10 includes at least one mobile device 15, at least one multifunctional document processing device 20, a computing device 27, a communication link or a connection 17, and a network 25. In the illustrated example, they system 10 includes a tablet and a smart-phone operated by a user (not shown). In alternative examples, the user can own or operate different wireless devices (e.g., cellular telephone, laptop, PDA, wireless television, wireless entertainment systems, and other similar wireless devices).

Each of the mobile devices 15 includes software, hardware (e.g., processor, memory, etc. not shown), or a suitable combination thereof configured to enable functionality of the mobile devices 15 and to allow them to interact with the multifunctional document processing device 20 or other devices. For example, the mobile devices 15 include communication interfaces that are used to connect with the other wireless devices or to a network. The communication interfaces of the wireless devices 15 may include a Wi-Fi interface, a Bluetooth interface, a 3G interface, a 4G interface, a near filed communication (NFC) interface, and any other suitable interface (e.g., RFID, Radar, etc.).

The mobile devices 15 are connected to the multifunctional document processing device 20 via the connection 17. In some examples, the connection 17 is local connection (e.g., Wi-Fi, Bluetooth) and not a satellite connection. The multifunctional document processing device 20 can be a printer, copier, scanner or another device. The multifunctional device 20 is fixed in location and has processing capabilities. In one example, the multifunctional device 20 can be a "hub-like" device connects to other local printing, scanning, imaging etc. devices. The multifunctional document processing device 20 is connected to the network 25 and to the computing device 27. The computing device 27 can be internal to the multifunctional device 20 or can be also external to the multifunctional device 20. In the illustrated example, the computing device 27 includes a processor 30, a memory 35, and a service request execution module 40 to execute service requests from the plurality of mobile device 15.

The network 25 connects the co multifunctional document processing device 20 to other devices or systems (not shown) so the multifunctional device 20 can transmit information to these systems and the systems can transmit information to the multifunctional device 20. The network 25 may include any suitable type or configuration of network to allow the multifunctional device 20 to communicate with the mobile device 15 or any other systems or devices.

For example, the network 25 may include a wide area network ("WAN") (e.g., a TCP/IP based network, a cellular network, such as, for example, a Global System for Mobile Communications ("GSM") network, a General Packet Radio Service ("GPRS") network, a Code Division Multiple Access ("CDMA") network, an Evolution-Data Optimized ("EV-DO") network, an Enhanced Data Rates for GSM Evolution ("EDGE") network, a 3GSM network, a 4GSM network, a Digital Enhanced Cordless Telecommunications ("DECT") network, a Digital AMPS ("IS-136/TDMA") network, or an Integrated Digital Enhanced Network ("iDEN") network, etc.). The network 25 can further include a local area network ("LAN"), a neighborhood area network ("NAN"), a home area network ("HAN"), a personal area network ("PAN"), a public switched telephone network ("PSTN"), an Intranet, the Internet, or any other suitable network.

The computing device 27 provides functionality to operate the multifunctional device 20 to and to process the service requests received from the mobile device 15. Further, the computing device provides functionality to collect data from the mobile device so the system 10 may operate as a data aggregation system. That way, the owner or the operator of the multifunctional device 20 can take advantage of the processed service requests by the multifunctional device 20 and can collect data related to the mobile users and their devices 15. It is to be understood that the operations performed by the computing device 27 that are related to this description can be performed by any other computing device associated with or supporting the multifunctional device 20.

As described in additional detail below, in one example, the computing device 27 is connected to at least one multifunctional document processing device 20 and communicates with a plurality of mobile devices 15 by using a software application on the plurality of mobiles devices and on the multifunctional document processing device. The computing device 27 receives service requests from the plurality of mobile devices via the software application, where the service requests include service request data. The computing device 27 executes the service requests with the software application on the multifunctional document processing device 20 by connecting the multifunctional document processing device to the network 25, sends return data received in response to the service requests from the multifunctional document processing device 20 to the mobile devices 15, and aggregates the service request data, the return data, and a location data for the plurality of mobile devices 15 in a memory.

Figure 2:
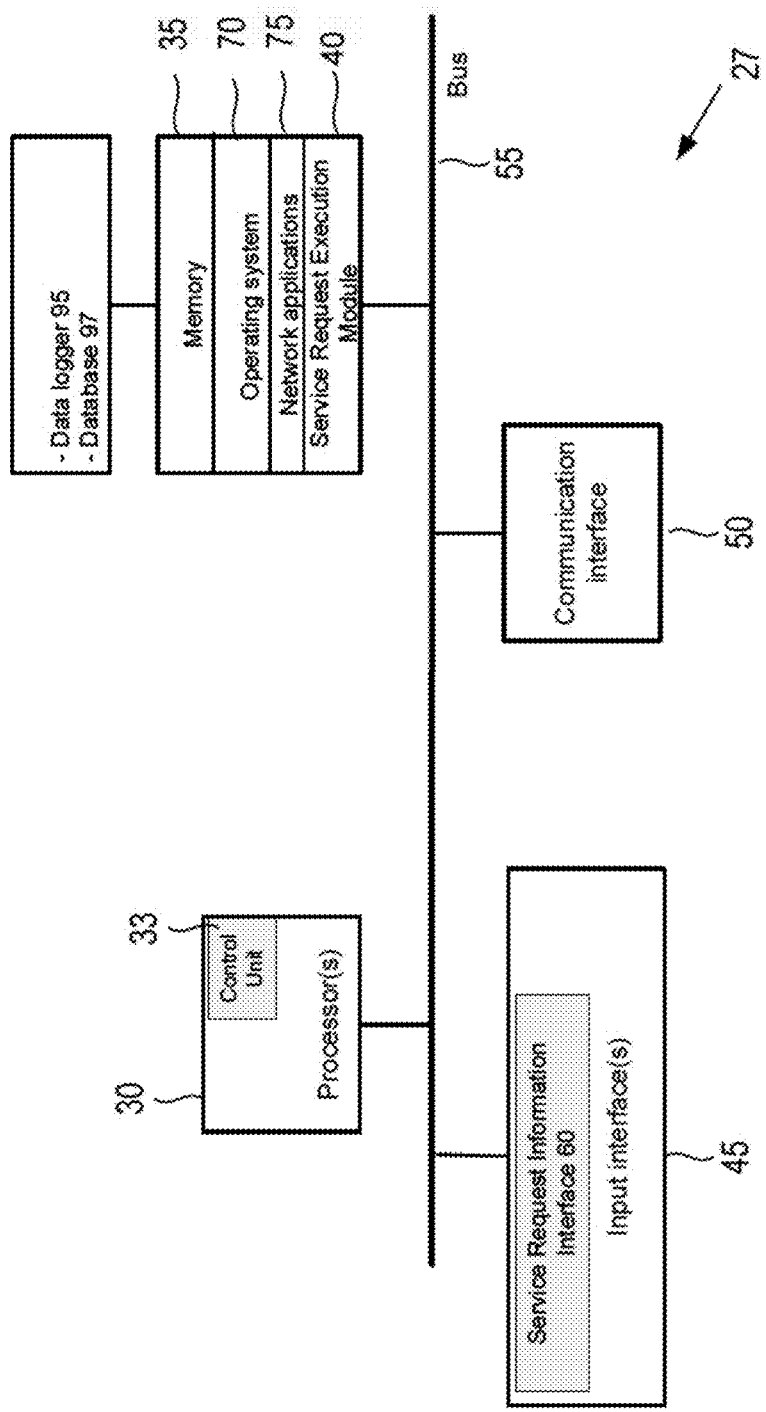
FIG. 2 illustrates a schematic representation showing an example of a computing device of the system of FIG. 1.

FIG. 2 shows a schematic representation of the computing device 27 of the system 10. It is to be understood that any other computing device may also be used to implement portions or all of the functionality of the computing device 27. The computing device 27 can be a server, a desktop computer, a laptop, or any other suitable device capable of carrying out the methods described below. The computing device 27 can be a device that is independent from the multifunctional device 20 or can be a device included in the multifunctional device 20. The computing device 27 includes a processor 30 (e.g., a central processing unit, a microprocessor, a microcontroller, or another suitable programmable device), a memory 35, input interfaces 45, and a communication interface 50. Each of these components is operatively coupled to a bus 55. In other examples, the computing device 27 includes additional, fewer, or different components for carrying out similar functionality described herein.

The communication interface 50 enables the computing device 27 and the multifunctional device 20 to communicate with a plurality of networks and communication links. The input interfaces 45 can process information from the mobile device 15, and other external devices/systems. In one example, the input interfaces 45 include at least a service request information interface 60. In other examples, the input interfaces 45 can include additional interfaces. The service request information interface 60 receives information regarding a service request (e.g., location based service or other services) from the mobile device 15. For example, the service request information interface 60 receives specific request data (e.g., a request for Mexican restaurants near zip code 60000) related to the details of the service request from the mobile device 15. The interface 60 can include, for example, a connector interface, a storage device interface, or a local or wireless communication port which receives the information from the mobile devices 15. In one example, the information regarding the social activities and the service requests from the mobile device 15 can be used to create or supplement databases stored in the memory 35.

The processor 30 includes a control unit 33 and may be implemented using any suitable type of processing system where at least one processor executes computer-readable instructions stored in the memory 35. The memory 35 includes any suitable type, number, and configuration of volatile or non-transitory machine-readable storage media 37 (shown in FIG. 3) to store instructions and data. Examples of machine-readable storage media 37 in the memory 35 include read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, hard disk, an SD card, and other suitable magnetic, optical, physical, or electronic memory devices. The memory 35 may also be used for storing temporary variables or other intermediate information during execution of instructions to be executed by processor 30.

The memory 35 may also store an operating system 70, such as Mac OS, MS Windows, Unix, or Linux; network applications 75; and various modules (e.g., the service request execution module 40). The operating system 70 can be multi-user, multiprocessing, multitasking, multithreading, and real-time. In addition, the memory 35 may store a virtual machine (not shown) or multiple operating systems (not shown) so the computing device 27 can switch between different operating systems (i.e., when the mobile device sending the service requests have different operating systems). Thus, the multifunctional device 20 can support communication with devices that have different operating systems. The operating system 70 can also perform basic tasks such as recognizing input from input devices, such as a keyboard, a keypad, or a mouse; sending output to a projector and a camera; keeping track of files and directories on memory 35; controlling peripheral devices, such as disk drives, printers, image capture device; and managing traffic on the bus 55. The network applications 75 include various components for establishing and maintaining network connections, such as computer-readable instructions for implementing communication protocols including TCP/IP, HTTP, Ethernet, USB, and FireWire.

The machine-readable storage media are considered to be an article of manufacture or part of an article of manufacture. An article of manufacture refers to a manufactured component. Software stored on the machine-readable storage media and executed by the processor 30 includes, for example, firmware, applications, program data, filters, rules, program modules, and other executable instructions. The control unit 33 retrieves from the machine-readable storage media and executes, among other things, instructions related to the control processes and methods described herein.

Figure 3:
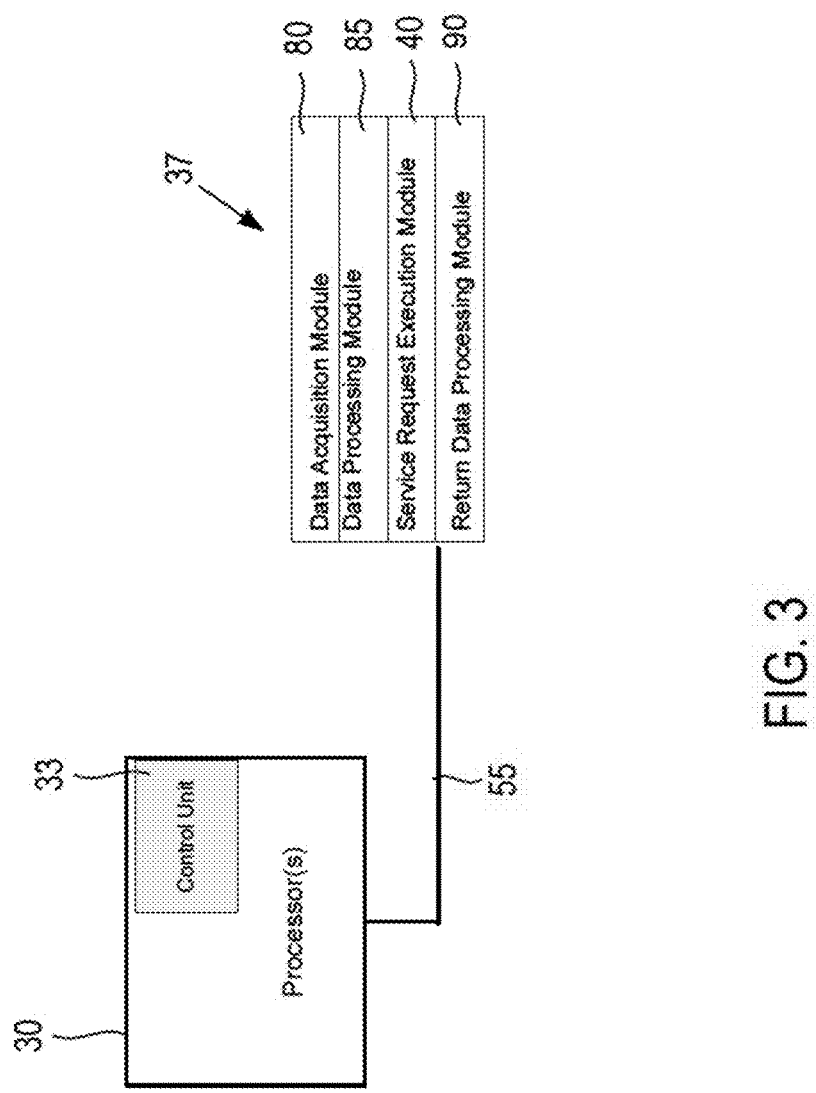
FIG. 3 is a schematic illustration showing an example of a machine-readable storage medium encoded with instructions executable by the processor of the computing device of FIG. 2.

FIG. 3 illustrates an example of the machine-readable storage medium 37 encoded with instructions executable by the processor 30 of the system 10. In one example, the machine-readable storage medium 37 includes a data acquisition module ("DAQ") 80, a data processing module 85, the service request execution module 40, and a return data processing module 90. In other examples, the machine-readable storage medium 37 can include more or fewer modules (e.g., various modules related to printing and/or document processing). As explained in additional detail below, the service request execution module 40 provides various computer-readable instruction components for executing the service request at the multifunctional document processing device 20 without providing the location of the mobile device 15 to a service provider of the mobile device. Further, the return data processing module 90 provides various computer-readable instruction components for processing the return data received on the multifunctional document processing device 20 based on the service request.

Each of the mobile devices 15 also includes a request execution module 40 (not shown on the mobile devices 15) that communicates with the request execution module 40 of the multifunctional device 20. As used herein, the term software application refers to the request execution module 40 on each mobile device 15 in combination with the request execution module 40 on the multifunctional device 20. It is to be understood that the software application related to the operation of the system 10 can include other modules and that the modules on the multifunctional device 20 and the mobile device 15 can supplement the operation of the software application. The request execution module 40 on each mobile device 15 may be in the form of a mobile application. In some examples, the mobile device 15 downloads the mobile application (i.e., the software application) via an online store, the device's manufacturer's website, via a dedicated server, etc. The software application at the mobile device 15 includes a software interface (not shown) where a user of the mobile device can enter the service request that is sent to the multifunctional device 20. That way, the software application or service request execution module 40 at the mobile device 15 facilitates anonymously transmitting a service request from the mobile device 15 to the multifunctional device 20 where the service request is executed and results are anonymously returned to the mobile device 15. Consequently, the mobile device 15 does not provide a location of the mobile device, a service request data, or return data to the service provider of the mobile device 15.

Information and data associated with the system 10, the mobile device 15, the multifunctional device 20, and other systems/devices can be stored, logged, processed, and analyzed to implement the control methods and processes described herein. In addition to the data acquisition module 80, the memory 35 includes a data logger or recorder 95 and at least one database 97. The DAQ module 80 receives information or data from the mobile device 15, the multifunctional device 20, and from various external devices or systems connected to the multifunctional device 20. In one example, the DAQ module 80 receives service request data related to the service request from the mobile device 15 and return data from an external system. The multifunctional device 20 may use a virtual machine (stored on the device 20 or the computing device 27) or otherwise support different operating systems. That way, the multifunctional device 20 may receive communicate with external devices that have different operating systems and may receive service request data and the return data. The return data may be generated in response to the service request sent by the multifunctional device 20. The service request data includes any information related to the specific service request that is entered by the user of the mobile device via the software interface of the mobile application. The return data may include any information that is based on a specific service requested transmitted by the mobile device 15 and executed by the multifunctional device 20.

The information gathered by the DAQ module 80 is provided to the data processing module 85 and the data logger or recorder 95. The data processing module 85 processes the information gathered by the DAQ module 80. The data logger or recorder 95 stores the information (e.g., service request data, return data, etc.) in the database 97 for further storage and processing. In the database, the information related to the service request by a mobile device can be correlated with a mobile device identification record for easier access and retrieval. In one example, the database 97 is included in the memory 35 of the computing device 27. In another example, the database 97 is a remote database (i.e., not located in the computer 27). In that example, the data logger or recorder 95 provides the information through a network (e.g., the network 25) to the database 97.

Therefore, the information and data stored in the database 97 can be accessed by the computing device 27 for processing. For example, by using the methods described below, the computing device 27 may assist with anonymizing the location of the mobile device 15 and the data generated and received by the mobile device 15. The control unit 33 retrieves from the machine-readable storage media and executes, among other things, instructions related to the control processes and methods described herein. When executed, the instructions cause the control unit 33 to connect the multifunctional document processing device 20 to at least one mobile device 15 using a local connection. The mobile device 15 and the multifunctional document processing device 20 include a software application.

Further, the instructions cause the control unit 33 to communicate with the mobile device 15 by using the software application and to operate the software application to receive a service request at the multifunctional document processing device 20 from the mobile device. The service request is generated by a user of the at least one mobile device with the software application. The instructions also cause the control unit 33 to connect the multifunctional device 20 to a network and to execute the service request with the software application at the multifunctional device 20 without providing a location of the mobile device to a service provider of the mobile device 15. In addition, the instructions cause the control unit 33 to receive return data in response to the service request at the multifunctional device 20 and to transmit the return data from the multifunctional device 20 to the mobile device 15. In the situation where the multifunctional device 20 is a part of a data aggregation system, the instructions may also cause the control unit 33 to aggregate the service request data, the return data, and a location data for the plurality of mobile devices in a memory.

Figure 4:
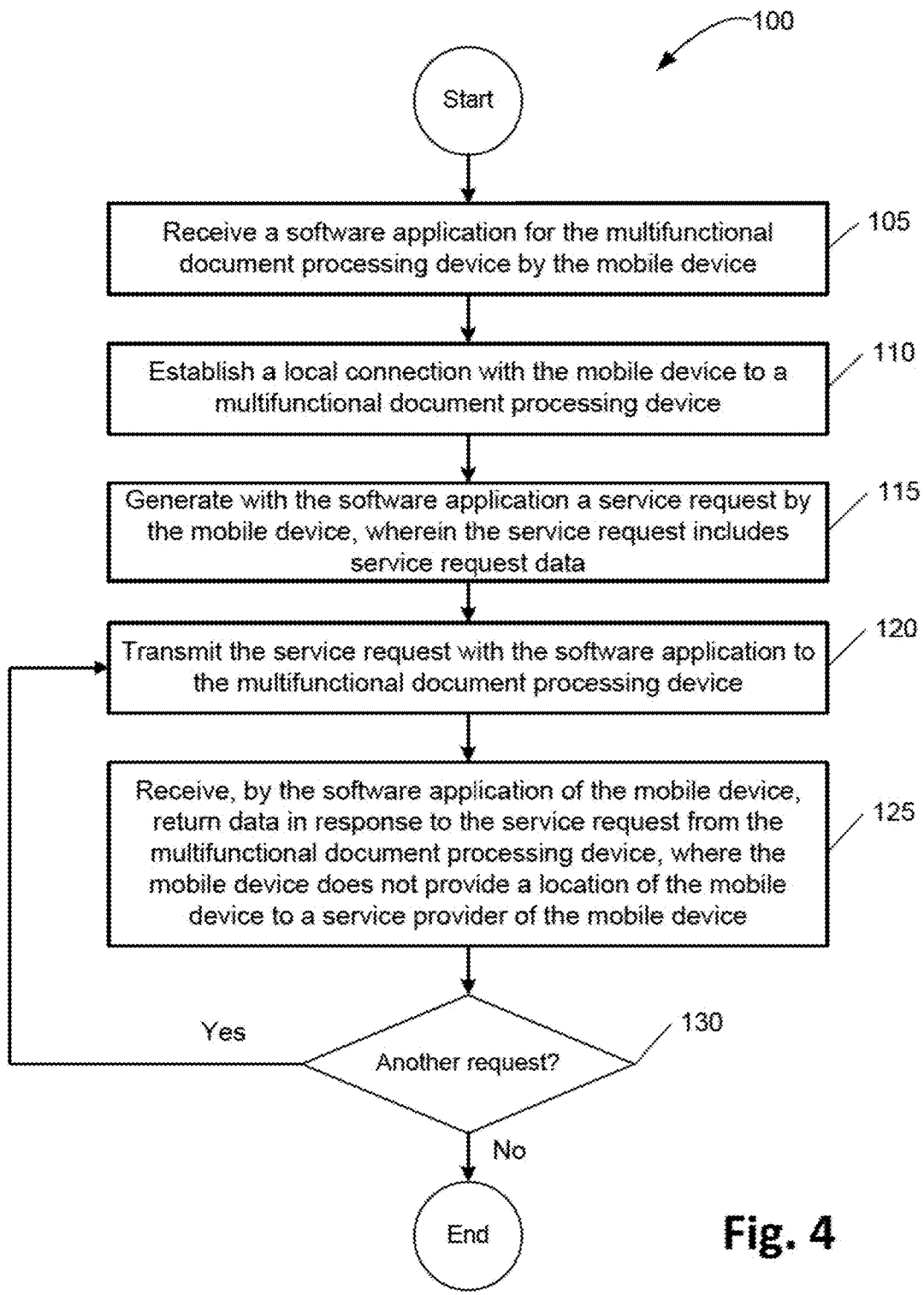
FIG. 4 illustrates a flow chart showing an example of a method for anonymously operating a mobile device.

FIG. 4 illustrates a flow chart showing an example of a method 100 for anonymously operating a mobile device 15. In one example, the method 100 can be executed by a control unit (not shown) of a processor (not shown) of the mobile device 15. The processor and the control unit of the mobile device 15 may be similar to the processor 30 and the control unit 33 of the computing device 27. Various steps described herein with respect to the method 100 are capable of being executed simultaneously, in parallel, or in an order that differs from the illustrated serial manner of execution. The method 100 is also capable of being executed using additional or fewer steps than are shown in the illustrated examples.

The method 100 may be executed in the form of instructions encoded on a non-transitory machine-readable storage medium executable by a processor of the mobile device 15. In one example, the instructions for the method 100 are stored in the service request execution module 40.

The method 100 begins in step 105, where the control unit of the mobile device 15 receives the software application for the multifunctional document processing device 20. In one example, the control unit of the mobile device receives (e.g., by downloading) the mobile application for the multifunctional device 20 that includes the service request execution module 40. Next, at step 110, the control unit of the mobile device 15 establishes a local connection with the mobile device 15 to the multifunctional document processing device 20. In one example, the mobile device uses a communication interface to connect to the multifunctional device 20 via the local communication link 17. The local communication link 17 can include Wi-Fi, Bluetooth, or any other local connection that does not provide direct information from the mobile device 15 to the mobile provider of the device 15.

At step 115, the control unit of the mobile device 15 generates, with the software application, a service request by the mobile device 15. In one example, the service request is generated by a user of the mobile device 15. As noted above, the service request includes service request data that is information regarding the specifics of the service request.

The service request can relate to a wide variety of services such as location based services, data intensive services such as routing from one on-line storage location to another, processor intense services such as map or other imaging interpretation, resource-intensive services such as complicated composite transaction-related services, and other services generally available to a user via the mobile device 15. The service request may be generated via a software interface of the software application on the mobile device. For example, once a user starts the software application and connects the mobile device to a local network, the user generates the service request in the user interface of the software application.

Next, the control unit of the mobile device 15 transmits the service request with the software application to the multifunctional document processing device 20 (at step 120). Thus, the control unit transmits the service request data to the multifunctional device 20. As described in additional detail below, the software application processes and executes all commands related to the service request on the multifunctional device 20 and no processing related to the request is performed on the mobile device 15. Therefore, no information related to the location of the mobile device 15 and related to the service request data is provided to the mobile provider by the mobile device 15. Because the mobile device 15 is not connected to the network of the mobile provider and the service request is executed on the multifunctional device 20, the mobile provider also does not have any access to the data related to the service request and to the location of the mobile device from the multifunctional device 20.

Then, the control unit of the mobile device receives, by the software application of the mobile device 15, return data in response to the service request from the multifunctional document processing device 20 (at step 125). The process for executing the service request on the multifunctional device 20 is described in additional detail below. As explained below, the multifunctional device 20 executes the service request with the software application on the multifunctional document processing device 20 and sends the return data with the software application of the multifunctional document processing device to the mobile device. The user of the mobile device 15 receives the return data on the software application 40 (e.g., the data is displayed by a user interface of the software application). Thus, the return data is not provided to the mobile provider. At step 130, the control unit of the mobile device determines if another service request is generated with the software application on the mobile device 15. If there is another service request, the control unit of the mobile device repeats steps 120 and 125. If there is no other request, the method 100 ends.

Figure 5:
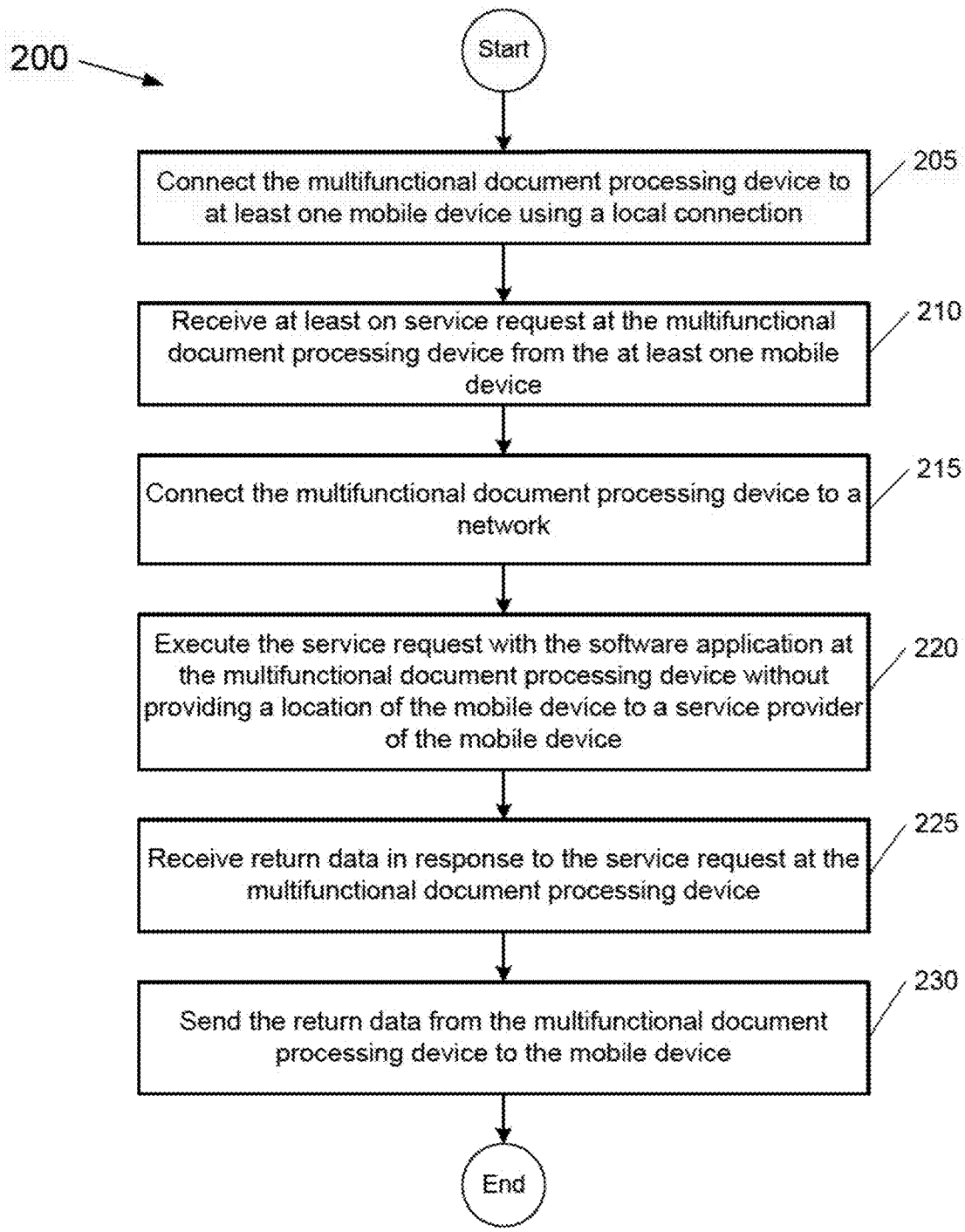
FIG. 5 illustrates a flow chart showing an example of a method for operating a multifunctional document processing device.

FIG. 5 illustrates a flow chart showing an example of a method 200 for operating a multifunctional document processing device 20. In one example, the method 200 can be executed by the control unit 33 of the processor of the multifunctional device 20. Various steps described herein with respect to the method 200 are capable of being executed simultaneously, in parallel, or in an order that differs from the illustrated serial manner of execution. The method 200 is also capable of being executed using additional or fewer steps than are shown in the illustrated examples.

The method 200 may be executed in the form of instructions encoded on a non-transitory machine-readable storage medium executable by a processor 30 of the computing device 27. In one example, the instructions for the method 200 are stored in the service request execution module 40 and the return data processing module 90 of the multifunctional device 20.

The method 200 begins at step 205, where the control unit 33 executes instructions to connect the multifunctional document processing device 20 to at least one mobile device 15 using a local connection. As noted above, the mobile device 15 and the multifunctional device 20 include a software application for anonymously operating a mobile device 15. That way, the computing device 27 can communicate with a plurality of mobile device 15 by using a software application on the plurality of mobiles devices and on the computing device 27 connected to the multifunctional device 20.

Next, the control unit 33 executes instructions to operate the software application to receive at least one service request (i.e., including service request data) at the multifunctional document processing device 20 from the at least one mobile device 15 (at step 210). As noted above, the service request is generated by a user of the mobile device 15 with the software application and information about the service request (i.e., the service request data) is not provided to the service provider by the multifunctional device 20. In some examples, the multifunctional document processing device 20 can receive multiple service requests from different mobile devices 15.

At step 215, the control unit 33 executes instructions to connect the multifunctional document processing device 20 to a network (e.g., the network 25). Then, the control unit 33 executes the service request with the software application at the multifunctional document processing device 20 without providing a location of the mobile device to a service provider of the mobile device (at step 220). As noted above, because the mobile device 15 uses the software application to generate and send the service request, the mobile device 15 also does not provide its location to the mobile provider. The multifunctional device 20 generates all commands related to the service request based on the received service request data and connects to an external environment (e.g., Google®) via the networks 25 to perform the search. In response to the user's service request executed by the multifunctional device 20, the control unit 33 receives return data (at step 225). For example, if the service request was for Mexican restaurants near zip code 60000, the multifunctional device 20 receives return data that includes information for such restaurants (e.g., list with twenty matching restaurants, location, price, reviews, etc.).

In another example, when the user's service request is transaction-related, the user may send a request with specific preferences (e.g., Mexican restaurant near zip code 60000, price range $0-$30, etc.). In response to such request, bidding can be performed and the return data can include a restaurant that best matches the user's preferences (e.g., location, price, menu choices, etc.). The bidding can be performed by a software application on the external environment (e.g., Google®) or with the software application on the multifunctional device 20 (e.g., by using the output of received form the external environment). In the situation where the multifunctional device 20 is a part of a data aggregation system, these types of transaction-related services may lead to better analytics of the users, since the preferences of the users can be provided to the businesses (e.g., restaurants, etc.) so they can react to the unfulfilled needs of their perspective customers.

Next, the control unit 33 sends the return data from the multifunctional document processing device 20 to the mobile device 15 with the software application (at step 230).

That way, the multifunctional document processing device 20 does not provide the service request data and the return data to the service provider of the mobile device. In one example, before sending the return data to the mobile device 15, the control unit 33 processes the return data with the return data processing module 90. For example, the control unit can save the return data in a database (e.g., the database 97) or can further organize the received return data (e.g., can send to the mobile device only the five top ranked Mexican restaurants). Alternatively, when the system 10 operates as a data aggregation system, the control unit 33 can aggregate the service request data, the return data, and a location data for the plurality of mobile devices in the memory 35 of the computing device 27. Therefore, the multifunctional device 20 can collect data related to a large number of mobile devices and their users. Depending on the user agreement between the multifunctional device 20 and the users of the mobile devices (i.e., installation of the software application on a mobile device may be subject to an agreement), the operator of the multifunctional device 20 may or may not use the accumulated data from the mobile device 15.

Figure 6:
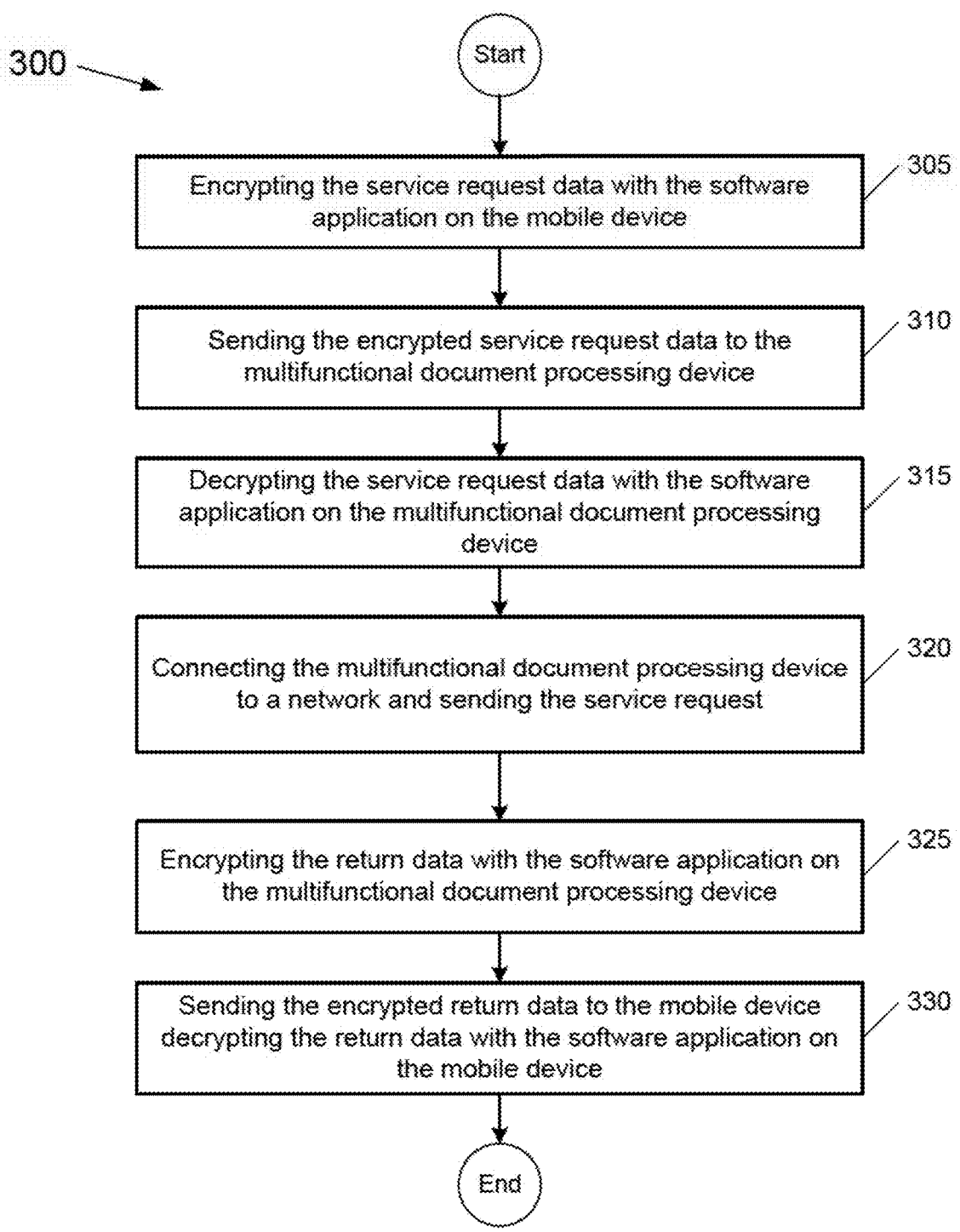
FIG. 6 illustrates a flow chart showing an example of a method for operating a web service between the mobile device and the multifunctional document processing device.

In some examples, the methods 100 and 200 include operating a web service between the mobile device 15 and the multifunctional document processing device 20. FIG. 6 illustrates a flow chart showing an example of a method 300 for operating a web service between the mobile device 15 and the multifunctional document processing device 20. Various steps described herein with respect to the method 300 are capable of being executed simultaneously, in parallel, or in an order that differs from the illustrated serial manner of execution. The method 300 may be executed in the form of instructions encoded on a non-transitory machine-readable storage medium executable by a processor (e.g., the processor 30 or a processor of the mobile device 15).

In one example, operating the web service between the mobile device 15 and the multifunctional device 20 includes providing a symmetric session key by the software application. The symmetric session key is used for encrypted communication between the mobile device 15 and the multifunctional device 20 so the data (e.g., service request data, return data, etc.) moving back and forth between the devices is encrypted and is not available to the mobile provider.

The method 300 begins at step 305 where the control unit encrypts the service request data from the service request with the software application on the mobile device. Next, the control unit sends the encrypted service request data to the multifunctional document processing device (at step 310). On the multifunctional device 20, the control unit decrypts the service request data with the software application (at step 315).

Next, at step 320, the control unit connects the multifunctional document processing device 20 to a network and sends the service request (e.g., sends data or commands). Then, the control unit encrypts the return data received in response to the service request with the software application on the multifunctional document processing device (at step 325). Finally, the control unit sends the encrypted return data to the mobile device 15 and decrypts the return data with the software application on the mobile device 15. As noted above, all commands and activities related to the user's service request are handled by the software application and they are not visible to the mobile provider. Thus, the location of the mobile user and the content sent and received between the devices 15 and 20 are anonymized.

What is claimed is:

1. A method for operating a mobile device, the method comprising:
    receiving a software application for the multifunctional document processing device by the mobile device;
    establishing a local connection with the mobile device to a multifunctional document processing device;
    generating with the software application a service request by the mobile device, wherein the service request includes service request data, the service request to retrieve information over a network other than the local connection;
    transmitting the service request with the software application to the multifunctional document processing device for the multifunctional document processing device to retrieve the information on behalf of the mobile device over the network without providing a location of the mobile device to a service provider of the mobile device; and
    receiving, by the software application of the mobile device, return data including the information in response to the service request from the multifunctional document processing device, wherein the mobile device does not provide the location of the mobile device to the service provider of the mobile device in retrieving the information because the multifunctional document processing device retrieves the information on behalf of the mobile device.

2. The method of claim 1, further comprising executing the service request with the software application on the multifunctional document processing device and sending the return data with the software application of the multifunctional document processing device.

3. The method of claim 1, wherein the service request data and the return data are not provided to the service provider by the mobile device.

4. The method of claim 1, wherein the multifunctional document processing device includes a multifunctional printer, a scanner, a copier, or a facsimile.

5. The method of claim 2, wherein transmitting the service request, executing the service request with the software application, and receiving return data in response to the service request includes operating a web service between the mobile device and the multifunctional document processing device.

6. The method of claim 5, wherein operating the web service includes encrypting the service request data with the software application on the mobile device and sending the encrypted service request data to the multifunctional document processing device.

7. The method of claim 6, wherein operating the web service further includes decrypting the service request data with the software application on the multifunctional document processing device, connecting the multifunctional document processing device to a network, and sending the service request.

8. The method of claim 7, wherein operating the web service further includes encrypting the return data with the software application on the multifunctional document processing device, sending the encrypted return data to the mobile device, and decrypting the return data with the software application on the mobile device.

9. A data aggregation system, the system comprising:
    at least one multifunctional document processing device connected to a plurality of mobile devices; and a computing device connected to the least one multifunctional document processing device, the computing device having a control unit to
communicate with the plurality of mobile devices by using a software application on the plurality of mobiles devices and on the computing device, the mobile devices and the computing device communicating with one another over local connections between the mobile devices and the computing device,
receive service requests from the plurality of mobile devices via the software application, wherein the service requests include location data of the mobile devices and service request data, the service requests to retrieve information over a network other than the local connections,
execute the service requests with the software application on the multifunctional document processing device by connecting the multifunctional document processing device to the network to retrieve the information for and on behalf of the mobile devices without the mobile devices having to provide locations of the mobile devices to a service provider of the mobile devices,
send return data, including the information, received in response to the service requests from the multifunctional document processing device to the mobile devices, and
aggregate the service request data, the return data, and the location data for the plurality of mobile devices in a memory.

10. The system of claim 9, wherein the multifunctional document processing device and the mobile devices do not provide the locations of the mobile devices to the service provider of the mobile devices during execution of the service requests.

11. The system of claim 9, wherein the multifunctional document processing device and the mobile devices do not provide the service request data and the return data to the service provider of the mobile devices.

12. A non-transitory machine-readable storage medium encoded with instructions executable by a processor of a multifunctional document processing device, the machine-readable storage medium comprising instructions to:
connect the multifunctional document processing device to a at least one mobile device using a local connection, wherein the mobile device and the multifunctional document processing device include a software application;
operate the software application to receive at least one service request at the multifunctional document processing device from the at least one mobile device, wherein the service request is generated by a user of the at least one mobile device with the software application and wherein the service request includes service request data, the service request to retrieve information over a network other than the local connection;
connect the multifunctional document processing device to the network;
execute the service request with the software application at the multifunctional document processing device to retrieve the information for and on behalf of the mobile device without providing a location of the mobile device to a service provider of the mobile device;
receive return data in response to the service request at the multifunctional document processing device; and
transmit the return data from the multifunctional document processing device to the mobile device to provide the information to the mobile device without the mobile device having to provide the location of the mobile device to the service provider.

13. The non-transitory machine-readable storage medium of claim 12, wherein the service request is generated with the software application on the mobile device, and wherein the service request data and the return data is not provided to the service provider.

14. The non-transitory machine-readable storage medium of claim 12, wherein the instructions to receive the at least one service request at the multifunctional document processing device further comprise instructions to encrypt the service request data with the software application at the mobile device, instructions to send the encrypted service request data to the multifunctional document processing device, and instructions to decrypt the service request data with the software application at the multifunctional document processing device.

15. The non-transitory machine-readable storage medium of claim 12, wherein the instructions to execute the service request further comprise instructions to send the service request via the network, instructions to encrypt the return data with the software application at the multifunctional document processing device, instructions to send the encrypted return data to the mobile device, and instructions to decrypt the return data with the software application at the mobile device.

* * * * *